United States Patent [19]
Maki

[11] Patent Number: 5,660,897
[45] Date of Patent: Aug. 26, 1997

[54] AUTOMOTIVE MOULDING WITH OFFSET GAS INJECTION APERTURE

[75] Inventor: Renji Maki, Aichi-ken, Japan

[73] Assignee: Tokai Kogyo Co., Ltd., Japan

[21] Appl. No.: 389,875

[22] Filed: Feb. 17, 1995

[51] Int. Cl.⁶ .................................................. B60R 13/04
[52] U.S. Cl. .............................. 428/31; 52/716.5; 293/128
[58] Field of Search .................. 428/31, 96; 52/716.5, 52/9; 293/128, 11

[56] References Cited

U.S. PATENT DOCUMENTS 5,194,305  3/1993  Shirahata et al. ................. 428/31

FOREIGN PATENT DOCUMENTS 2-63255  5/1990  Japan ................................. 428/31

*Primary Examiner*—Henry F. Epstein
*Attorney, Agent, or Firm*—Quarles & Brady

[57] ABSTRACT

An automotive moulding has a gas channel extending longitudinally in the widthwise central part on the back side and is manufactured by a gas injection moulding. The gas channel is formed with a hollow portion. The gas injection aperture is situated at one end of the hollow portion. The shape of the gas channel changes gradually toward the one end. The gas injection aperture is deviated in the direction of width off the extreme side edge of the hollow portion. A gas escape port is formed at the other end of the hollow portion. The gas escape port is deviated in the direction of width from the hollow portion. The direction of deviation is the same as that of the gas injection aperture. The opening of the gas escape port is directed sidewardly with respect to the automotive moulding. The opening is closed by the automotive body when the automotive moulding is attached to an automobile.

8 Claims, 3 Drawing Sheets

AUTOMOTIVE MOULDING WITH OFFSET GAS INJECTION APERTURE

FIELD OF INVENTION

The present invention relates to a moulding installed on an automotive body.

BACKGROUND OF INVENTION

Mouldings for automobiles are installed chiefly for a decorative purpose for example on automotive doors. Such mouldings also serve a protective purpose by preventing damage to door and side panels of a vehicle caused by minor impacts. Recent mouldings are in most cases manufactured by a gas injection moulding process. The gas injection moulding process is a process for manufacturing a plastics moulding by providing a thick-wall portion called a gas channel in the moulding, incompletely filling a molten resin in this thick-wall portion, and then blowing a gas into the gas channel during or after filling the molten resin.

The gas channel is mostly provided in a central portion in the direction of width. According to the gas injection moulding process, the molten resin is moved by a gas pressure in the direction of width of the gas channel. Therefore, the travel of the molten resin must be uniform in the direction of width, or there will occur such defects as weld, ununiform resin dispersion, sinking, and others, resulting in an desirable non-uniform hollow portion having decreased strength.

There are also used mouldings each having two or more gas channels. For example, some mouldings are provided with gas channels in both side edges in the direction of width, so that a molten resin goes from the side edges to the central part in the direction of width. For even such a moulding, it is designed that the molten resin moves for an equal travel as in the case of the moulding having the gas channel in the central part in the direction of width.

In prior art mouldings, the gas injection aperture for filling the gas in the gas channel is provided on the extension of the gas channel. However, the adoption of such a structure is accompanied by the following problem.

In the case of a moulding attached on an automotive body, water such as rain water is likely to enter the hollow portion through the gas injection aperture made in the moulding. The water that has once entered will stay in the hollow portion, and will leak out little by little during travel of the automobile, staining the automobile.

Closing the gas injection aperture can prevent the entrance of rain water, etc., but this is impractical because it will increase manufacturing process and cost.

Japanese Utility Model Laid-Open No. 63255/1990 gives an example of a prior art moulding for automobiles, in which a gas injection aperture 3 is provided in the back side 4 of the moulding corresponding to a hollow portion 2. The water that has entered at the gas injection aperture 3 stays in the lower edge of the hollow portion 2 and cannot be discharged.

It is an object of the present invention to provide an automotive moulding designed to prevent entrance of rain water, etc. into a hollow portion.

SUMMARY OF INVENTION

In the automotive moulding of the present invention having a gas channel extending in a longitudinal direction and a hollow portion formed in the gas channel, the above-described problem can be solved by using the automotive moulding in which a gas injection aperture formed in one end of the hollow portion is offset or deviated in the direction of width off the extreme side edge of the hollow portion.

Deviating the gas injection aperture in the direction of width off the extreme side edge of the hollow portion can prevent entrance of water such as rain water into the hollow portion at the gas injection aperture. Provided that water enters the hollow portion, the water will be discharged immediately without staying in the hollow portion.

It is desirable that the opening of the gas injection aperture be deviated in the direction of width of the moulding, in order that when the molding is attached to the automobile, the opening of the gas injection aperture will be directed downwardly. That is, it is possible to prevent entrance of water completely by directing the opening in a different direction of travel of the automobile.

It is also desirable that a gas escape port provided in the other end of the hollow portion be deviated in the direction of width off the extreme side edge of the hollow portion, and that the gas injection aperture and the escape port be offset in the same direction.

The adoption of this structure prevents water from being sucked into the gas injection aperture through its opening if the pressure in the hollow portion has decreased through the escape port during travel of the automobile.

Furthermore, it is desirable that the opening of the escape port be directed in the direction of width of the moulding, for it has the same effect as in the case that the opening of the gas injection aperture is directed in the direction of width of the moulding.

BRIEF DESCRIPTION OF THE DRAWINGS

FIG. 8 is a sectional view taken along line 3—3 of the automotive moulding of FIG. 2.

EMBODIMENTS

Hereinafter, an embodiment of an automotive moulding according to the present invention will be explained with reference to the accompanying drawings. The mouldings as described herein are generally applied to the exterior of an automobile on the doors or other side panel. As is well known, such panels serve a decorative purpose, and protect the side panels from damage caused by minor impacts (such as opening doors of adjacent vehicles in an automobile parking lot). The automotive moulding 10 has a thick-wall portion extending in a longitudinal direction, that is, a gas channel 12, in the Central part in the direction of width on the back side. The automotive moulding 10 of the present invention is manufactured by the gas injection moulding process. Therefore, a hollow portion 14 is formed in the gas channel 12.

Figure 1:
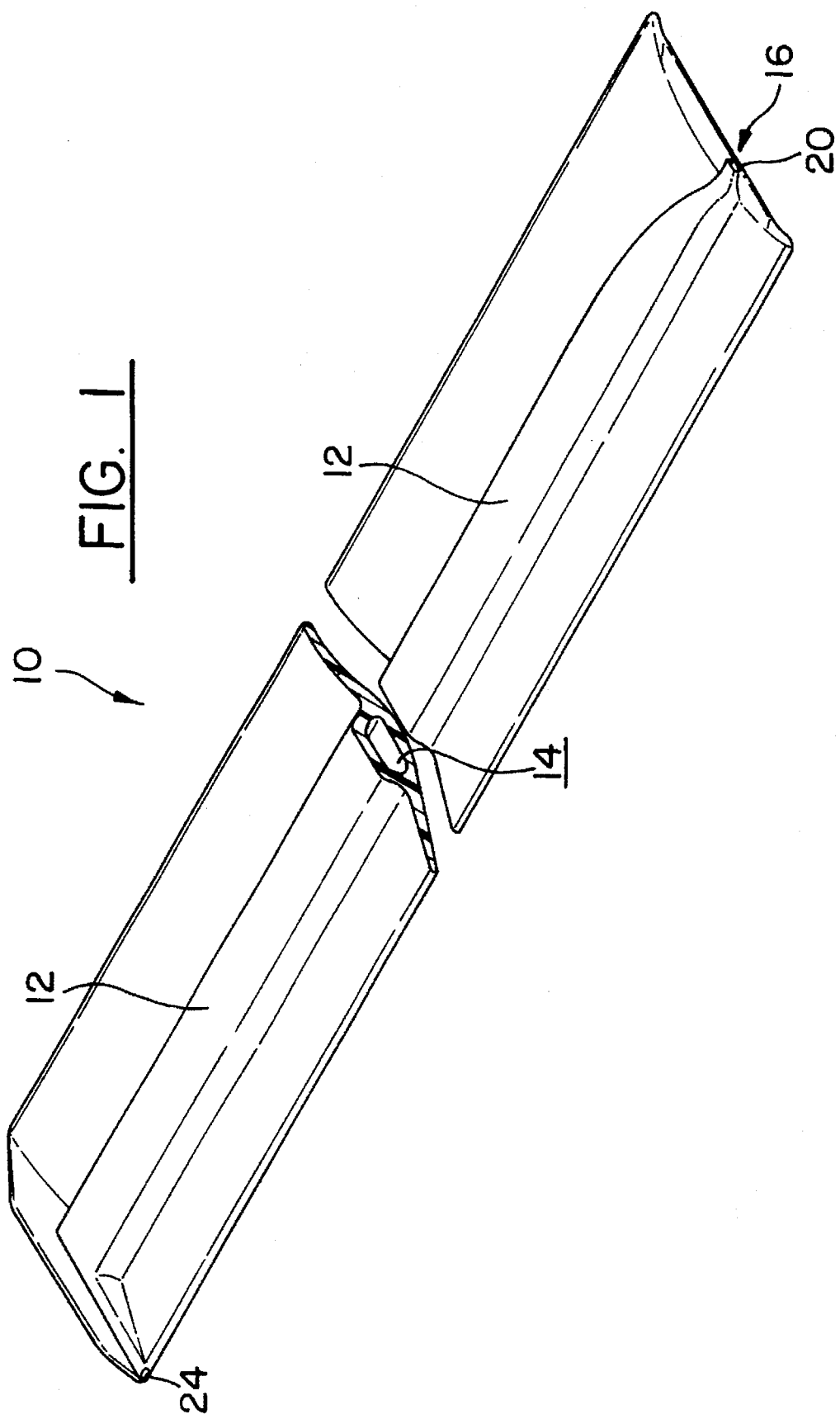
FIG. 1 is a perspective view showing an embodiment of an automotive moulding according to the present invention.

In the moulding produced by the gas injection moulding process, the gas injection aperture 16 for filling the gas is positioned in one end (on the right in FIGS. 1 and 2) of the hollow portion 14. The shape of the gas channel 12 smoothly changes as it goes towards one end. The gas injection aperture 16 is deviated in the direction of width off the extreme side edge 18 of the hollow portion 14. The opening 20 of the gas injection aperture 16 is as large as around 1 to 3 mm in diameter.

Figure 2:
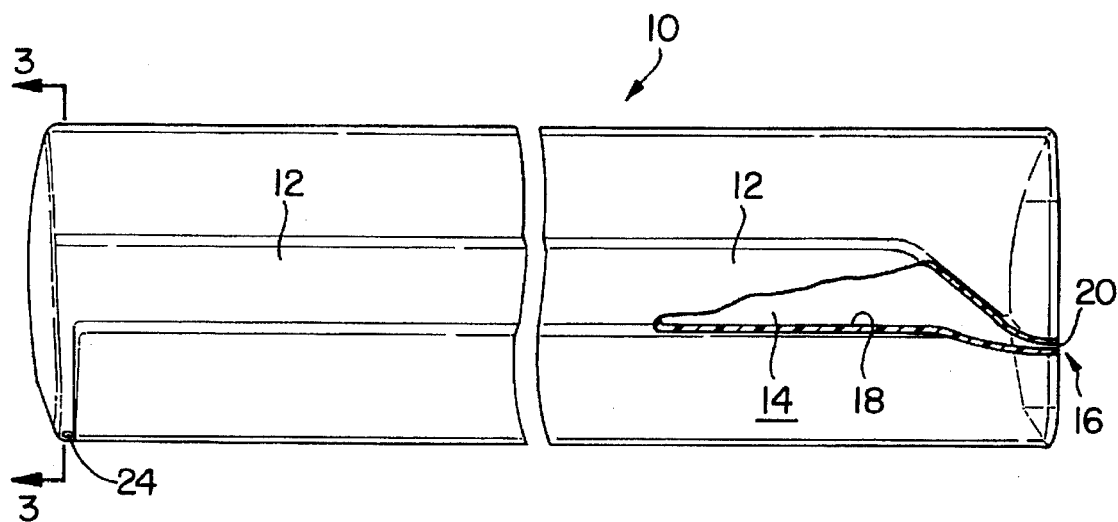
FIG. 2 is a plan view of the automotive moulding of FIG. 1.

In the embodiment illustrated, the opening 20 of the gas injection aperture 16 is directed in the longitudinal direction, but is desired to be directed in the direction of width (downward in FIG. 2).

Figure 3:
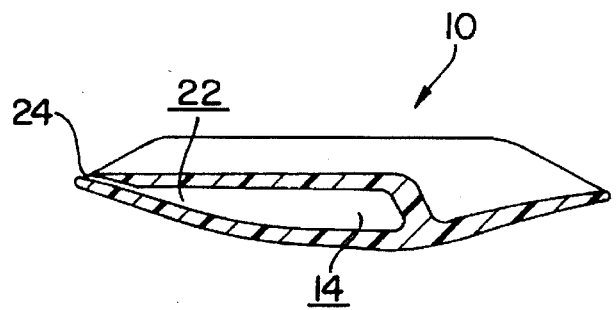

In the other end of the hollow portion 14 is formed a gas escape port 22, as shown in FIG. 3. The gas escape port 22 is deviated in the direction of width from the hollow portion 14. The direction of deviation is the same as the gas injection aperture 16. The opening 24 of the gas escape port 22 is directed in the direction of width of the automotive moulding 10. The opening 24 is closed by the automotive body when the automotive moulding 10 is attached to an automobile.

ADVANTAGES OF INVENTION

According to the invention, since the gas injection aperture is deviated in the direction of width off the extreme side edge of the hollow portion, there is formed a stepped portion or an inclined portion in the direction of width between the gas injection aperture and the extreme side edge of the hollow portion. When the moulding is attached to the automobile, water will not reach the hollow portion through the gas injection aperture because of the offset position of the gas injection aperture.

Figure 4:
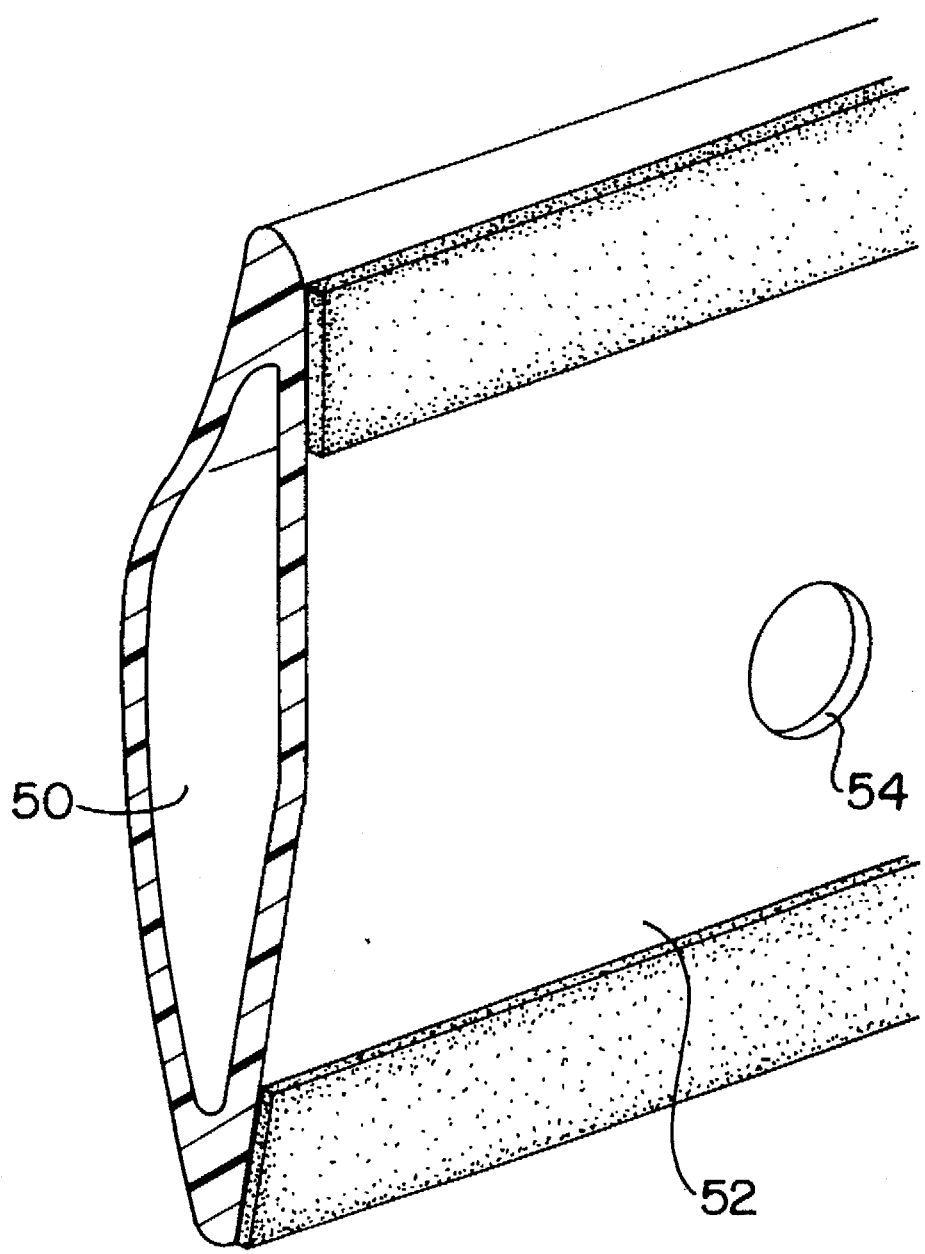
FIG. 4 is a sectional view of a prior art automotive moulding.

If heavy rain water or splash of water has entered the hollow portion, the water can easily be discharged during travel of the automobile. This provides a distinct advantage over automobile mouldings of the prior art. As shown in FIG. 4, automobile moulding strips of the prior art provide a gas injection aperture 54 on the backside of the moulding corresponding to a hollow portion 50. In the prior art, any water that has entered hollow portion 50 at the gas injection aperture 54, stays in the lower edge of the hollow portion 50 and is discharged slowly in the course of movement of the vehicle.

Further according to the invention, because the escape port is closed by the automotive body, no gas suction pressure will act on the escape port. Therefore, a pressure in the hollow portion will not be reduced, thus preventing the suction of water into the hollow portion at the gas injection aperture.

Finally, the openings of the gas injection aperture and the gas escape port are directed downwardly, whereby the entry of water into the automotive body can be prevented.

What is claimed is:

1. An elongated plastic automotive moulding for application to the exterior of an automobile sidewall panel, for protecting said side wall panel from minor impacts and improving the appearance of said side wall panel, said moulding comprising:

a front face and a rear face joined along an upper and a lower edge; and, a gas channel defined between said front and rear faces and extending longitudinally along the length of said moulding, said gas channel having a gas injection aperture at one longitudinal end thereof, said gas injection aperture being offset transversely of said length of said moulding, to one of said edges of said gas channel.

2. An automotive moulding according to claim 1, wherein said gas injection aperture has an opening directed transversely of said length of said moulding.

3. An automotive moulding according to claim 2, wherein said gas channel has, at the other longitudinal end, a gas escape port offset transversely of said length of said moulding, to said one of said edges of said gas channel to which said gas injection aperture is offset.

4. An automotive moulding according to claim 3, wherein said gas escape port has an opening, which is closed by an automotive body when the moulding is attached to an automobile.

5. An automotive moulding according to claim 1, wherein said gas channel has, at the other longitudinal end, a gas escape port offset transversely of said length of said moulding, to said one of said edges of said gas channel to which said gas injection aperture is offset.

6. An automotive moulding according to claim 5, wherein said gas escape port has an opening directed transversely of said length of said moulding.

7. An automotive moulding according to claim 5, wherein said gas escape port has an opening, which is closed by an automotive body when the moulding is attached to an automobile.

8. An elongated plastic automotive moulding for application to the exterior of an automobile side-wall panel, for protecting said side wall panel from minor impacts and improving the appearance of said side wall panel, said moulding comprising:

an elongated hollow moulding body, said moulding body having a front face and a rear face joined along an upper and a lower edge to define a gas channel; and, a gas injection aperture at one end of said elongated hollow molding body, said gas injection aperture positioned adjacent to said lower edge, and said gas channel tapering in width toward said gas injection aperture;

whereby water entering said gas channel is drained through said gas injection aperture.

* * * * *